FLUID ACTUATED LOGICAL DEVICES

Original Filed April 29, 1963 2 Sheets-Sheet 1

United States Patent Office 3,311,301 Patented Mar. 28, 1967

3,311,301

FLUID ACTUATED LOGICAL DEVICES

Henri Chabrier, Lyon (Rhone), and André Saint-Joanis, Sainte-Foy-les-Lyon (Rhone), France, assignors to Societe d'Electro-chimie, d'Electro-metallurgie et des acieries electriques d'Ugine, a corporation of France Original application Apr. 29, 1963, Ser. No. 276,565, now Patent No. 3,242,946, dated Mar. 29, 1966. Divided and this application Aug. 26, 1965, Ser. No. 482,880
Claims priority, application France, May 4, 1962, 896,501
8 Claims. (Cl. 235—201)

This application is a division of the U.S. patent application Ser. No. 276,565 filed on Apr. 29, 1963 by the same applicants now Patent Number 3,242,946.

This invention relates to binary type fluid devices which are adapted to denote the various basic logical functions which are usually performed in digital data processing.

Fluid pressure digital computers and data processing devices have priorly been disclosed, particularly in the United States Patent 3,057,551, patented Oct. 9, 1962, by Thomas L. Etter, for "Fluid Pressure Digital Computer" and in the United States Patent 3,070,295, patented Dec. 25, 1962, by Hans H. Glattli, for "Fluid Operated Logical Devices."

Such devices are constructed of a number of fluid pressure relays interconnected by fluid channels. Each of the relays is a fluid-operated valve comprising a housing having input and output ducts and a valve member movable within the housing between two positions and adapted in each said positions to couple said ducts in a given manner, whereby the device assumes two different states of stability, and produces an output which manifests the stability state "zero" or "one" in which it rests.

It is an object of the present invention to provide a logical circuit or data processing device which makes use of a basic relay structure of the above general type which is adapted to be operated through the sole action of only two fluid pressure sources at the respective "0" and "1" pressure levels, while avoiding the use of a spring or any other mechanism or solenoid to bias the relay to one of its two positions, yet being adapted to perform the logical NOT function.

A further object of the invention is to provide a logical circuit which makes use of a basic relay structure of the above general type wherein any communication is avoided between the "0" and "1" fluid pressure levels.

Yet a further object is to provide a logical circuit which makes use of a basic relay structure built in accordance with the United States Patent No. 3,242,946 filed on Apr. 29, 1963 by the same applicants, for: "Valves actuated by fluid under pressure."

It is yet another object of the invention to provide AND, OR, and NOR gates constructed of a comparatively small number of interconnected fluid pressure relays.

It is still another object operatively to combine fluid pressure relays so as to provide a memory unit.

Yet another object is operatively to combine a plurality of fluid pressure relays so as to perform various logical functions.

The various objects and advantages of this invention will become clearly apparent from the following description and the appended drawings.

Figure 12:
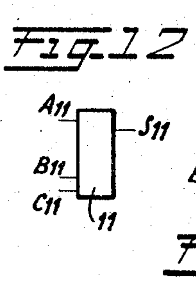

FIG. 12 diagrammatically shows a logical circuit which performs the function $S_{11}=A_{11}\times\overline{B}_{11}\times\overline{C}_{11}$.

Figure 13:
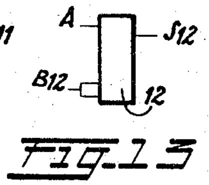

FIG. 13 diagrammatically illustrates a NOT gate.

Figure 14:
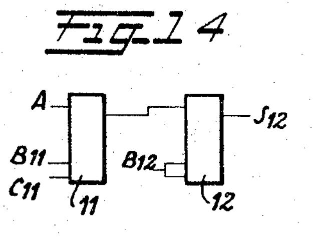

FIG. 14 illustrates a three-input NOR gate.

Figure 15:
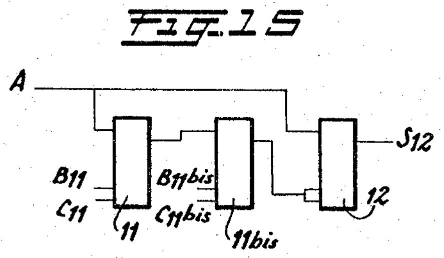

FIG. 15 illustrates a four-input OR gate.

Figure 16:
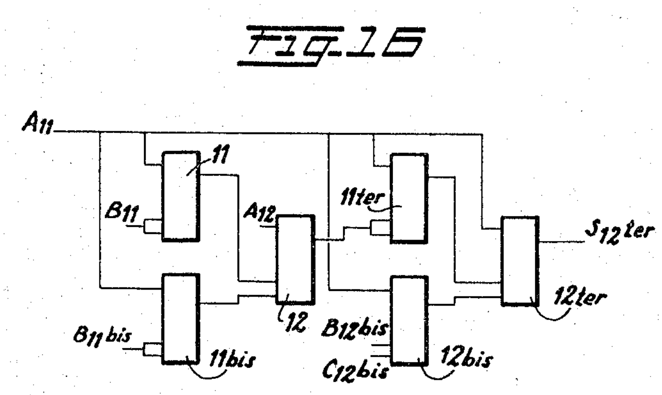

FIG. 16 illustrates a five-input AND gate.

Figure 1:
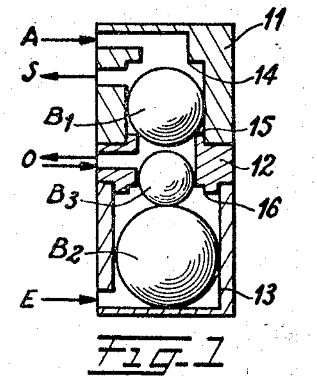
FIG. 1 is a simplified structural drawing of a valve which is adapted for use as the basic relay structure of the present invention.

Referring more specifically now to FIG. 1, there is shown a relay structure comprising a valve which includes three balls $B_1$, $B_2$ and $B_3$, movable within a hollow body. The latter, in the embodiment shown in FIG. 1, comprises three distinct parts 11, 12 and 13, which are assembled together. Such a relay structure has already been disclosed in the United States patent above referred to.

It may be considered that the inner cavity of the hollow member 11–12–13 includes a first chamber portion provided with a first orifice A, a second chamber portion, provided with a second orifice S, a third chamber portion provided with a third orifice O, and a fourth chamber portion provided with a fourth orifice E.

The orifice A admits, for instance, a supply fluid pressure $P_A$; orifice E admits a control or signal pressure $P_E$; orifice O, for instance, opens onto the atmosphere, or communicates with any other means for defining a constant reference pressure level, this level being the lowest one of the fluid pressure levels applied to the various orifices of the valve. At the orifice S, a fluid pressure $P_S$ will be obtained.

The first and second chamber portions communicate with one another through a seating 14, which is closed by ball $B_1$, adapted for this purpose. The second and third chamber portions communicate with one another through a seating 15, which is closed by ball $B_1$, in the position as illustrated in FIG. 1. The third and fourth chamber portions communicate with one another through a seating 16, for the closing of which ball $B_2$ is adapted. Ball $B_3$ does not close any seating but transmits to ball $B_2$ the force exerted on ball $B_1$, and vice versa.

Now let $q_1$ and $q_2$ be the major sectional areas of the respective balls $B_1$ and $B_2$:

$Q_2$ the section of seating 16
$Q_1$ the section of seating 14
$Q_0$ the section of seating 15

It follows that $$q_2>Q_2;\ q_1>Q_1;\ q_1>Q_0$$

A simplified theory of the operation of the device shown in FIG. 1 will be set forth: the starting position being as illustrated in FIG. 1, the control pressure $P_E$ is gradually increased starting from an initially selected fluid pressure value.

When $$\frac{P_E}{P_A}=\frac{Q_0}{q_2}$$

at first approach, the force exerted by $P_E$ on ball $B_2$ balances the force exerted by $P_A$, while forcing the ball $B_1$ on to seating 15.

If it is supposed that $$\frac{P_E}{P_A} > \frac{q_1}{q_2}$$

the result is that as soon as ball $B_1$ has stopped closing seating 15, this ball will move, and provided that $$\frac{P_E}{P_A} > \frac{Q_1}{Q_2}$$

ball $B_1$ will close seating 14 at the same time as ball $B_2$ will then close seating 16.

For this purpose it will be sufficient to carefully select the height of the body part with respect to the diameter of ball $B_3$.

The operation of the device may be summarized by means of the following table:

| A | E | S |
|---|---|---|
| O | O | O |
| O | $P_E$ | O, with $P_E = P_A \cdot \frac{Q_1}{Q_2}$ |
| $P_A$ | $P_E'$ | O |
| $P_A$ | O | $P_A$ |

$$P_E' > P_E$$

Pressure $P_A$ is admitted to output passageway S only if the inlet A is supplied and if inlet E is not submitted to a fluid pressure exceeding $$P_A \times \frac{Q_1}{Q_2}$$

In other words, the arrangement of FIG. 1 performs the function $s = a \times e$.

When permanently supplied with a constant fluid pressure at A, which may be considered as binary level 1, the arrangement performs the NOT function $s = \bar{e}$.

Figure 2:
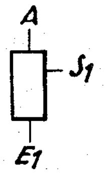
FIG. 2 is a schematic representtaion of the structural apparatus of FIG. 1.

FIG. 2 is a schematic representation of such a logical NOT circuit, in which $E_1$, denotes the input signal, $S_1$, the output signal and A the supply.

It is remarked that the operation of such a logical circuit is extremely simple, the mere establishing or cutting of the control pressure at E providing the transfer of one stable condition of the device to the other.

Due to the fact that there is no communication of the actuation pressure chamber either with the output pressure or the reference pressure chambers, no loss of the actuation pressure may exist.

Therefore, on the condition that ball $B_2$ has a cross-section at least slightly larger than that of ball $B_1$, the actuation pressure may be selected to the supply input pressure ("1" pressure level).

Then, the device will operate with two pressure levels only, namely the "0" level and the "1" level.

It is further remarked that, as a result of the above emphasized absence of communication between the reference and actuation pressure chambers, not only will the device operate with an improved stability and dependability but also, the actuation fluid even when noxious, will not contaminate the source of reference pressure (which will be, in practice, the atmosphere, in the pneumatic embodiments of the device).

In FIGURES 2 to 10 and 12 to 16, the reference A without index, located opposite an inlet, means that this inlet is continuously under pressure.

The expansion orifices O are not illustrated, though they actually exist in the illustrated devices.

Figure 3:
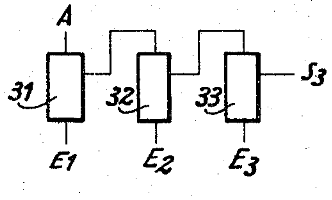
FIG. 3 shows a three-input NOR gate.

FIG. 3 illustrates a gate performing the three-input NOR function. Such a gate comprises three units of the type as illustrated in FIG. 2, respectively denoted 31, 32, 33, and having three respective signal inputs $E_1$, $E_2$, $E_3$. The output of unit 31 is connected to the supply input of unit 32, whereas the output of the latter is connected to the supply input of unit 33, the latter having in turn an output $S_3$.

It will be easily understood that the operation of the device is represented by the equation:

$$s_3 = a \times \bar{e}_1 \times \bar{e}_2 \times \bar{e}_3$$

with $a = 1$.

Figure 4:
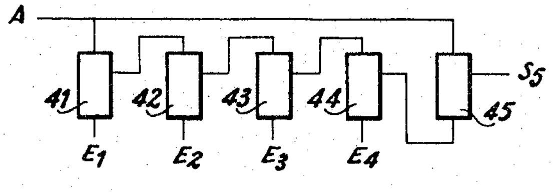
FIG. 4 illustrates a four-input OR gate.

FIG. 4 illustrates a gate performing the four-input OR function. Such a gate comprises five units of the type as illustrated in FIG. 2, respectively denoted 41 to 45, and having four respective signal inputs $E_1$ to $E_4$. The output of unit 41 is connected to the supply input of unit 42, whereas the output of the latter is connected to the supply input of unit 43. The output of the latter unit is in turn connected to the supply input of unit 44, whereas the output of unit 44 is connected to the signal input of unit 45. The supply A is connected to the respective supply inputs of units 41 and 45. Unit 45 has an output $S_5$, which is the output of the whole arrangement.

It will be easily understood that the operation of the device is represented by the equation $$s_5 = a \times (e_1 + e_2 + e_3 + e_4)$$

with $a = 1$.

Figure 5:
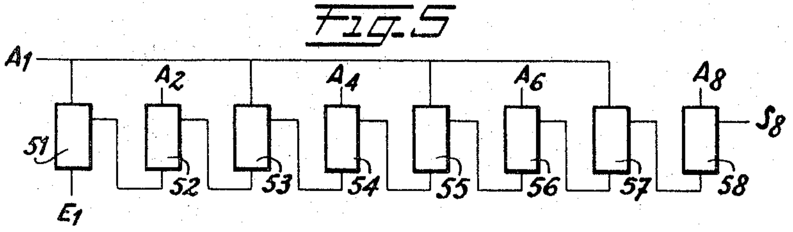
FIG. 5 shows a five-input AND gate.

FIG. 5 illustrates an embodiment of a gate performing the five-input AND function. Such a gate comprises eight units, of the type as illustrated in FIG. 2, respectively denoted 51 to 58. The output of each of the units 51 to 57 is connected to the signal input of the corresponding following unit. The supply inputs of the odd numbered corresponding units are connected to the permanent supply $A_1$, whereas the supply inputs $A_2$, $A_4$, $A_6$, $A_8$ of the units with even numbers are connected to independent sources of input supply pressure. The device has a signal input $E_1$ and a signal output $S_8$.

It will be easily understood that the operation of the device is represented by the equation:

$$s_8 = e_1 \times a_2 \times a_4 \times a_6 \times a_8$$

As is well known to those skilled in the art, whatever logical sequence, as complex as it may be, may always be expressed in terms of logical functions NOT, NOR, AND, OR. By suitably grouping the logical units of the types as illustrated in FIGS. 2 to 5, whatever sequence may be provided for.

The relay structure disclosed in FIGS. 1–2, moreover, is apt to provide a memory unit.

As is known, a memory unit is a bistable device performing the change of a fugitive signal ($m$) into a permanent one ($s$). It is possible to cancel the latter by means of a cancelling fugitive signal ($a$).

The corresponding logical equation in the Boolean notation, is $$s = a(m + n)$$

with ($n$) identical to ($s$).

The meaning of this is that signal ($s$) exists if ($a$) exists at the same instant as ($m$) or ($n$).

Figure 6:
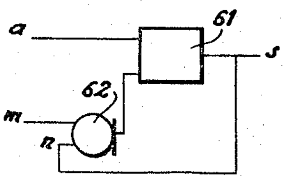
FIG. 6 is a block diagram of a memory unit.

FIG. 6 is a block diagram of a memory unit including an AND circuit 61 and an OR circuit 62, the operation of which conforms to the above description.

According to this invention a memory unit will preferably consist of an even number and particularly of two-fluid actuated valves of the type as illustrated in FIG. 1, the inlet $E_n$ of any one of the valves being connected to the outlet $S_{n-1}$ of the preceding one, and the inlet $E_1$ of the first valve being fed back from the outlet $S_n$ of the last one, the respective fluid supplies of the valves being connected in parallel with two groups each including an odd number of consecutive valves, the first group being fed under a constant fluid pressure, exception made for the instant of application of the fugitive signal ($m$), the second group being fed under a constant fluid pressure, except for the instant of application of the fugitive cancelling signal ($a$).

Figure 7:
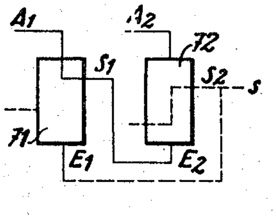
FIGS. 7 and 8 illustrate in rest position and in operating position a memory unit essentially consisting of two relays of the type shown in FIG. 1.
Figure 8:
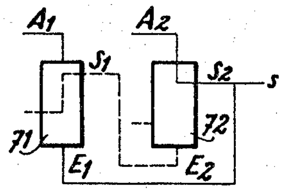

As an example, FIGS. 7 and 8 illustrate the operation of such a memory unit consisting of two valves 71 and 72, the lines under pressure being indicated in continuous lines and those not under pressure in broken lines. In FIG. 7 the memory is at rest, elements 71 and 72 are fed in $A_1$ and $A_2$; no signal whatsoever is put out at S.

In FIG. 8, a fugitive signal $(m)$ being applied to the valve 71 in the form of a short interruption in the supply $A_1$, the system has turned over and now delivers in S a permanent output signal fed by $A_2$, although the supply $A_1$ has gone back to normal. This signal will only be cancelled when fugitive cancelling signal $(a)$ is applied to the valve 72 in the form of a short break in the supply $A_2$ of the valve 72, which will reset the system to the state illustrated in FIG. 7.

The operation of a memory including an even number of valves higher than two, is similar to that of the one just described. Each of the two fluid supplies A1 and A2 is connected in parallel across an even number of consecutive serially connected valves.

Such memory units may be employed each on their own or may be comprised in logical complex circuits or control circuits.

Figure 9:
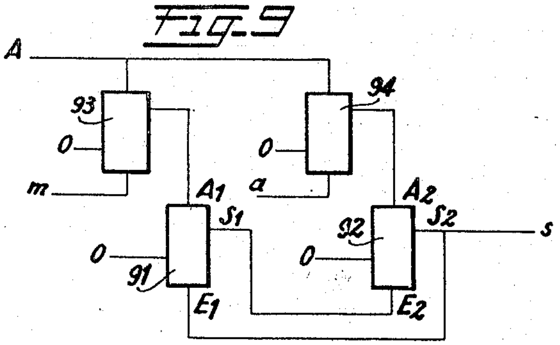
FIGS. 9 and 10 illustrate variations of such a memory unit.

As a first example, FIG. 9 illustrates a memory unit with two valves 91 and 92, wherein the signals $(m)$ and $(\bar{a})$ are applied in the form of a short turn-over of a third and a fourth valve, 93 and 94 respectively, these two valves being identical to the two first ones and connected as shown.

Figure 10:
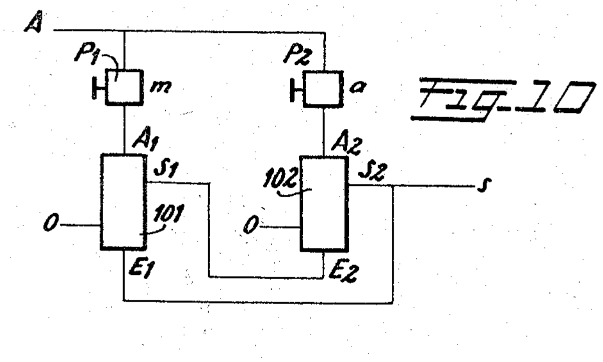

A second example is illustrated in FIG. 10. Signals $(m)$ and $(\bar{a})$ are generated by means of push-buttons P1 and P2 interrupting and connecting to the atmosphere the respective fluid supplies A1 and A2 of the valves 101 and 102 of the memory unit. In this arrangement the two push-buttons are "self-sustained."

The above disclosed applications of the basic relay structure according to the invention are in no way limitative.

Apart from its economical manufacture, the possibility of its miniaturization, and its facility to provide complex logical circuits, the logical element according to this invention possesses a certain number of remarkable properties.

First of all it is to be emphasized that in its construction a certain clearance will generally be admitted systematically between balls B1 and B2 and the corresponding portions of the hollow body (11 and 13 respectively).

This clearance entails leakages during the transient states corresponding to the turn-over from one stable state to the other. This provides a rapid return of the pressures towards the reference pressure level, thus reducing the reset time of the device.

It is to be understood that there should be no leakage whatsoever when the device has attained one of its stable states; this condition is met within the structure illustrated in FIG. 1 and in the variations described hereinafter.

As the clearance ratio needs no precise definition an accurate machine-finishing of the parts of the device is not needed, which considerably cuts down the manufacturing cost.

It is remarked that the device according to the present invention may be either pneumatic or hydraulic. In the latter case, the outlets will have comparatively small cross-sections in order to restrict the output liquid flow.

It is further observed that the device may suitably operate with different fluids respectively applied in A and E, for instance. In this case it is obvious that the clearance as mentioned above has to be eliminated or adapted conveniently in order to avoid mixing the fluids during the turn-over.

It will be observed that no external reset means whatsoever are necessary for the resetting of the arrangement of FIG. 1 and that no loss of pressure of the fluid is necessary for the operation thereof.

Moreover, referring particularly now to FIG. 1, it may be seen that the basic relay structure may perform an amplifying function, on the condition, however, that $$P_E Q_2 > P_A Q_1$$

Thus it is possible to vary in a wide range the power output provided by the device.

As far as the practical embodiment of the arrangement is concerned, several variations may be considered. The arrangement may consist of an assembly of parts, obtained either by machine-finishing or by moulding. The seats of the movable members may be made integral with the hollow body or may be detachable therefrom. In the last case they may consist of a flexible material.

The fluids utilized, in liquid or gaseous form, may have any viscosity, as the latter hardly has any influence on the operation of the device.

Figure 11:
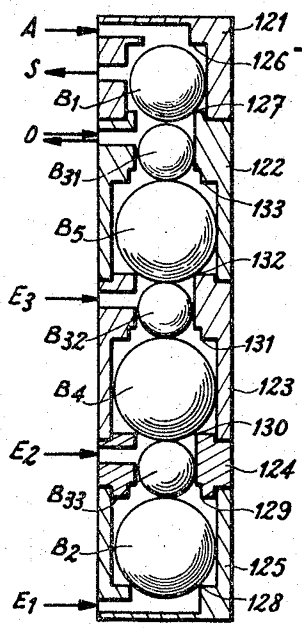
FIG. 11 is a sectional illustration of a modified relay structure which is adapted to perform the three-input NOR function.

The basic relay structure may also be the object of variations, as particularly shown in FIG. 11.

FIG. 11 illustrates a device performing the three-input NOR function.

This device possesses a supply inlet A, three signal inputs $E_1$, $E_2$ and $E_3$, an outlet S and an orifice O which communicates with means for defining a constant pressure reference level. It comprises a hollow body built in five assembled parts 121 to 125, balls $B_1$, $B_2$, $B_4$ and $B_5$ which are respectively adapted to close seats 126–127, 128–129, 130–131 and 132–133, and balls $B_{31}$, $B_{32}$, $B_{34}$ only provided for transmitting the forces.

The output S is fed via A only when no signal exists on either of the inputs $E_1$, $E_2$ and $E_3$.

When ball $B_1$ closes seats having a cross-section smaller than those of the seats closed by the larger ball $B_2$, $B_4$ and $B_5$, an amplification of the input signals is obtained at the output S.

FIG. 12 diagrammatically illustrates a basic relay structure of the type as shown in FIG. 11, having three inputs $A_{11}$, $B_{11}$, $C_{11}$, and output $S_{11}$, and performing the function $$s_{11}=a_{11}\times\bar{b}_{11}\times\bar{c}_{11}$$

This basic element allows for the establishment of most of the logical functions or sequences, as well as the element in FIG. 2.

FIGS. 13 to 16 illustrate various embodiments of elementary functions.

FIG. 13: NOT function $$s_{12}=a\times\bar{b}_{12}$$

with $a=1$.

FIG. 14: three-input NOR function $$s_{12}=a\times\bar{b}_{11}\times\bar{c}_{11}\times\bar{b}_{12}$$

with $a=1$

The device of FIG. 14 includes two elements 11 and 12 of the type as shown in FIGS. 12 and 13 respectively.

FIG. 15: four-input OR function $$s_{12}=a\times(b_{11}+c_{11}+b_{11\text{bis}}+c_{11\text{bis}})$$

with $a=1$.

The device of FIG. 15 includes three elements of which 11*a* and 11bis are of the type as shown in FIG. 12, and 12 of the type as shown in FIG. 13.

FIG. 16: five-input AND function $$s_{12\text{ter}}=a_{11}\times b_{11}\times b_{11\text{bis}}\times a_{12}\times(b_{12\text{bis}}+c_{12\text{bis}})$$

The device of FIG. 16 includes six elements of which 12, 12bis and 12ter are of the type as shown in FIG. 12, and 11, 11bis and 11ter of the type as shown in FIG. 13.

It is to be understood that the above showing and description should be taken in an illustrative or diagrammatic sense only and not in any limiting sense. There are modifications to this invention which will fall within the scope and spirit thereof, and which will be apparent to those skilled in the art. The scope of the invention should be limited only by the scope of the appended claims.

What is claimed is:

1. A fluid-actuated binary logical device including at least first and second valve structures, each of said valve structures performing the NOT function and having a hollow body provided with a chamber therein, said chamber comprising at least first, second, third and fourth serially connected chamber portions arranged for allowing fluid passage along a predetermined path from any chamber portion to the adjacent chamber portions, each of said chamber portions having, in the walls thereof, first, second, third and fourth passageways, respectively; said first and fourth passageways being fluid inlet passageways, said second passageway being an outlet passageway; means, in communication with said third passageway, delivering a binary zero fluid pressure level; means, in communication with at least one of said inlet passageways, delivering a binary one fluid pressure level, at least three seatings arranged substantially normally to said path, at least one of said seatings separating said third and fourth chamber portions from each other; at least first and second valve closing members movable in said chamber and adapted to seat against said seatings for closing the communication between the respective chamber portions, said first valve closing member being adapted to close the communication between said first and second chamber portions and between said second and third chamber portions, said logical device further comprising means connecting the second passageway of said first valve structure to at least one of the fluid inlet passageways of said second valve structure, whereby the operation of the second valve structure is controlled by the outlet pressure of the first valve structure.

2. A logical NOR circuit comprising a plurality of fluid actuated logical binary devices connected in series, each of said binary devices including a hollow body having a chamber therein, said chamber comprising at least first, second, third, and fourth mutually adjacent chamber portions having, in the walls thereof, first, second, third and fourth passageways, respectively, said first and fourth passageways being fluid inlet passageways, said second passageway being an outlet passageway; means, in communication with said third passageway, delivering a binary zero fluid pressure level, said third chamber portion separating said first and fourth chamber portions; at least three seatings, and at least two valve closing members movable in said chamber and adapted to seat against said seatings for closing the communication between the respective chamber portions; only said first inlet passageway being adapted to communicate with said third outlet passageway; means for connecting the outlet passageway of each of said binary devices, excepting the last binary device of the series to the respective first inlet passageways of the following binary device of the series and means, in communication with the first passageway of the first binary device of the series, delivering a binary "one" pressure level.

3. A logical OR circuit comprising a plurality of fluid-actuated binary devices connected in series, each of said binary devices including a hollow body having a chamber therein, said chamber comprising at least first, second, third, and fourth mutually adjacent chamber portions having, in the walls thereof, first, second, third and fourth passageways, respectively, said first and fourth passageways being fluid inlet passageways, said second passageway being an outlet passageway; means, in communication with said third passageway, delivering a binary zero pressure level, said third chamber portion separating said first and fourth chamber portions; at least three seatings, and at least two valve closing members movable in said chamber and adapted to seat against said seatings for closing the communication between the respective chamber portions; only said first inlet passageway being adapted to communicate with said third outlet passageway; means for connecting the outlet passageway of each of said binary devices, excepting the two last binary devices of the series, to the first inlet passageway of the following binary device of the series; means for connecting the outlet passageway of the second last binary device of the series to the fourth passageway of the last binary device and means, connected to the first inlet passageways of the first and last binary devices of the series, for providing a binary one fluid pressure level.

4. A memory unit comprising an even number of fluid-actuated binary devices connected in series, each of said binary devices including a hollow body having a chamber therein, said chamber comprising at least first, second, third and fourth mutually adjacent chamber portions having, in the walls thereof, first, second, third and fourth passageways, respectively, said first and fourth passageways being fluid inlet passageway, said second passageway being an outlet passageway; means, in communication with said third passageway, delivering a binary zero pressure level, said third chamber portion separating said first and fourth chamber portions; a least three seatings, and at least two valve closing members movable in said chamber and adapted to seat against said seatings for closing the communication between the respective chamber portions; only said first inlet passageway being adapted to communicate with said third outlet passageway; means for connecting the fourth passageway of each of said binary devices, excepting the first binary device of the series, to the outlet passageway of the preceding binary device of the series; and means for connecting the fourth passageway of said first binary device to the outlet passageway of the last binary device of the series.

5. A fluid-actuated logical binary device including a hollow body having a chamber therein, said chamber comprising at least first, second, third, fourth and fifth mutually adjacent chamber portions having in the walls thereof at least first, second, third, fourth and fifth respective passageways; at least five seatings, and at least three valve closing members movable in said chamber and adapted to seat against said seatings for closing the communication between the respective chamber portions, and means, in communication with said third passageway, delivering a binary zero fluid pressure level, said second passageway being an outlet passageway; said first passageway being an inlet passageway adapted to communicate with said outlet passageway, and said fourth and fifth passageway being further inlet passageways, said valve closing members preventing any communication between said further inlet passageways on one hand and said second and third passageways, on the other hand; said device further comprising means, in communication with at least one of said first, fourth and fifth passageways, for delivering a binary one fluid pressure level.

6. A fluid-actuated NOT circuit comprising a hollow body having a chamber therein, said chamber comprising at least first, second, third, fourth and fifth mutually adjacent chamber portions; having, in the walls thereof, at least first, second, third, fourth and fifth respective passageways, said first passageway being an inlet passageway and said second passageway being an outlet passageway and at least five seatings; at least three valve closing members movable in said chamber and adapted to seat against said seatings for closing the communication between the respective chamber portions; means, in communication with said third passageway, delivering a binary zero fluid pressure level; said fourth and fifth passageways being inlet passageways and being interconnected; and means, connected to said first passageway, delivering a binary one fluid pressure level.

7. A NOR circuit including first and second fluid-actuated logical binary devices, each of said binary devices comprising a hollow body having a chamber therein, said chamber comprising at least first, second, third, fourth and fifth mutually adjacent chamber portions having, in the walls thereof, at least first, second, fourth and fifth respective passageways, said first, fourth and fifth passageways being inlet passageways, said second passageway being an outlet passageway and at least five seatings, at least three valve closing members movable in said chamber and adapted to seat against said seatings for closing the communication between the respective chamber portions; means in communication with said third passageway, for delivering a binary zero pressure level, means connecting the outlet passageway of said first binary device to the first passageway of said fourth binary device, the second and fifth passageways of said second binary device being mutually connected; and means connected to the first passageway of said first binary device for delivering a binary one fluid pressure level.

8. An OR circuit including first, second and third fluid-actuated logical binary devices, each comprising a hollow body having a chamber comprising at least first, second, third, fourth and fifth mutually adjacent chamber portions therein, said chamber having, in the walls thereof, at least first, second, third, fourth and fifth respective passageways, said first, fourth and fifth passageways being inlet passageways, said second passageway being an outlet passageway and at least five seatings, at least three valve closing members movable in said chamber and adapted to seat against said seatings for closing the communication between the respective chamber portions; means, in communication with said third passageway, delivering a binary zero pressure level; means connecting the outlet passageway of said first binary device to the first passageway of said second binary device; means connecting the outlet passageway of said fourth binary device to the second and fifth passageways of said third binary device, and means, connected to the respective first passageways of said first and third binary devices, for providing a binary one fluid pressure level.

References Cited by the Examiner

UNITED STATES PATENTS

| | | | |
|---|---|---|---|
| 2,739,613 | 3/1956 | Kulikoff | 137—625.27 |
| 2,985,141 | 5/1961 | Gustafson | 251—30 |
| 3,151,623 | 10/1964 | Riordan | 235—201 |
| 3,242,946 | 3/1966 | Chabrier et al. | 137—625.65 |

RICHARD B. WILKINSON, *Primary Examiner.*

L. R. FRANKLIN, *Assistant Examiner.*